United States Patent
Heinzel et al.

(10) Patent No.: US 7,739,345 B2
(45) Date of Patent: Jun. 15, 2010

(54) ALERT NOTIFICATION ENGINE

(75) Inventors: Thomas Heinzel, San Francisco, CA (US); Claus Gschiermeister, Karlsruhe (DE)

(73) Assignee: SAP AG, Walldorf (DE)

( * ) Notice: Subject to any disclaimer, the term of this patent is extended or adjusted under 35 U.S.C. 154(b) by 1074 days.

(21) Appl. No.: 10/742,833

(22) Filed: Dec. 23, 2003

(65) Prior Publication Data

US 2004/0225718 A1 Nov. 11, 2004

Related U.S. Application Data

(60) Provisional application No. 60/458,396, filed on Mar. 31, 2003.

(51) Int. Cl.
*G06F 15/16* (2006.01)
(52) U.S. Cl. .................. 709/207; 709/203; 709/218
(58) Field of Classification Search ................ 709/207, 709/218, 224, 203; 719/318
See application file for complete search history.

(56) References Cited

U.S. PATENT DOCUMENTS

| | | | |
|---|---|---|---|
| 6,751,657 B1 * | 6/2004 | Zothner | 709/220 |
| 6,857,017 B1 * | 2/2005 | Faour et al. | 709/224 |
| 7,209,916 B1 * | 4/2007 | Seshadri et al. | 707/3 |
| 7,225,250 B1 * | 5/2007 | Harrop | 709/224 |
| 7,412,481 B2 * | 8/2008 | Nicholls et al. | 709/204 |
| 2004/0068481 A1 * | 4/2004 | Seshadri et al. | 707/1 |

OTHER PUBLICATIONS

SAP NetWeaver™, pp. 1-8, © 2003.
SAP APO with SAP liveCache 7.4, pp. 1-4, © 2003.
U.S. Appl. No. 10/742,832, filed Dec. 23, 2003, entitled "Time Series Data Management".
U.S. Appl. No. 10/742,793, filed Dec. 23, 2003, entitled "Order Document Data Management".
U.S. Appl. No. 10/742,794, filed Dec. 23, 2003, entitled "Alert Engine".

* cited by examiner

*Primary Examiner*—Djenane M Bayard
(74) *Attorney, Agent, or Firm*—Finnegan, Henderson, Farabow, Garrett & Dunner, L.L.P.

(57) ABSTRACT

Methods and apparatus, including computer program products, are provided for encapsulating functions to select or filter alerts relevant for messaging to specific recipients, to create appropriate alert notification messages and to actively send them through various message channels. This may be done according to rules depending on content of alert, recipient, and time. As an example, the present invention allows selecting alerts from connected applications, to process them, and to send alert notification messages to the intended recipients.

15 Claims, 12 Drawing Sheets

ALERT NOTIFICATION ENGINE

DETAILED DESCRIPTION

This application claims priority under 35 U.S.C. §119 based on U.S. Provisional Application Number 60/458,396, filed Mar. 31, 2003, the complete disclosure of which is incorporated herein by reference.

FIELD OF THE INVENTION

This application relates to an alert notification engine and, more particularly, to methods and systems for informing parties of alert situations.

BACKGROUND INFORMATION

Computer systems, and in particular distributed computer networks that execute application programs may encounter exceptional situations. These exceptional situations may be unexpected, and may have impact on other parties participating at the network. Therefore, the applications of the computer system or the distributed computer network generate alerts to inform one or more users about the exceptional situation. Such kinds of alerts may be the termination of a contract, a delivery problem for an order, a decline in revenue, or technical problems in a system.

A central point to collect, view, and act upon exception messages related to Advanced Planner and Optimizer (APO—a software product delivered by SAP Aktiengesellschaft, Walldorf, Germany) and other supply chain management (SCM) data across applications, is the Alert Monitor provided by SAP. Up to now, the functions to actively inform users of the existence of alerts are limited insofar as one can assign an alert profile to a user such that the corresponding alerts are evaluated for messaging. This is done by a report, which can be started interactively or scheduled periodically for a selection of users. With this mechanism, alerts are sent by SAP office or e-mail. The alert information that is selected through the alert profile is always aggregated: given is the number of alerts by alert type and priority only. In addition in the e-mail there is a hyperlink to the alert monitor's web screen. Further, it has been possible to send individual alerts interactively from the alert monitor display using SAP office, which also allows sending notes with the alert.

SUMMARY OF THE INVENTION

It is an object of the present invention to extend the functionality for sending alerts in one or more of the following areas: (1) flexible communication settings to determine message content and recipients using notification profiles: configure alert selections, prioritization, message modes for each recipient; configure frequency of alert notification dependent on settings; configure (re-)notification for unconfirmed and overdue alerts (escalation process); (2) support of different message modes, which are needed to deal with the large number of alerts that might occur: individual messaging of single messages for each alert; collective messaging of several alerts in one message; aggregated messaging of information on alert numbers; (3) support of different message channels, as for example e-mail, telefax, pager, SMS (short message service in GSM), WAP (wireless application protocol) pages, portal inbox, and integration with external messaging applications; (4) user time settings for message channel: flexible notification of users/partners with regard to message channel; rules depending on (recurring) time intervals including calendar functionality; maintained by user or administrator; (5) pull notification mechanism: periodic/scheduled search for relevant data; dependent on frequency defined in communication settings; (6) push notification mechanism: direct notification when alerts are created; only possible for alerts that are actively posted by applications; in the context of APO alert monitor relevant for all data base alerts; (7) event based notification mechanism: external events lead to a pull for relevant message content by the Alert notification engine; supply chain event management (SCEM) integration; general application integration; (8) escalation mechanism: notify responsible person/supervisor if an alert is not confirmed or deleted within a predefined time period; flexible combination of notification levels; and/or (9) representative rules: interface for rules to be provided by applications (APO alert monitor).

In accordance with one embodiment, methods and apparatus, including computer program products, are provided for encapsulating functions to select or filter alerts relevant for messaging to specific recipients, to create appropriate alert notification messages and to actively send them through various message channels. This may be done according to rules depending on content of alert, recipient, and time.

In accordance with another embodiment, the present invention allows selecting alerts from connected applications, to process them, and to send alert notification messages to the intended recipients.

In accordance with yet another embodiment of the invention, at least one alert message from at least one business application may be collected, and at least one alert may be generated and may be sent out to at least one recipient through at least one transmission channel, whereby alert collecting, alert notification message generating and sending out may be managed according to a configurable alert notification profile.

Advantageous implementations can include one or more of the following features. Alerts can be indicative of exceptional situations in the business applications. Exceptional situations may be defined as a relation of at least one variable of the respective business application to at least one predetermined value. An alert notification message can correspond to an alert. Alerts may be aggregated in a centralized engine. The alerts may be filtered, aggregated, bundled in statistic tables according to configurable rules. The alert notification profile may be administrated in the centralized engine.

The alert notification profile may be configured to comprise information relating to at least one of a group of recipients, a time schedule for transmission, a channel of transmission, and a method to create text out of the alert. Furthermore, the alert notification profile may be configured to comprise information relating to a time schedule for retrieval of alerts from a business application. The alert notification profile may be configured to further comprise a transmission format for the alert notification message.

The at least one business application may be accessed in predetermined time periods for retrieving alerts. The time periods may be administrated in the centralized engine.

At least one alert may be collected which is sent by the at least one business application.

The collected alerts may be triggered by a predetermined event in the same or another business application.

Status information may be received to select alerts that need to be taken into account for the notification messages.

Alert notification messages may be re-sent depending on status information on the respective alert.

The transmission channels may comprise at least one of SMS, WAP, fax, pager, telephone, cellular phone, and electronic mail.

In a further embodiment, the invention provides an alert notification method, wherein, according to a configurable alert notification profile, at least one alert from at least one business application may be collected, the at least one alert being indicative of an exceptional situation in the at least one business application, and at least one alert notification message corresponding to an alert may be generated and may be sent out to at least one recipient through at least one transmission channel, whereby the alert notification profile may be administrated in a centralized alert notification engine.

The alert notification profile may be administrated by a recipient.

In particular, the invention also comprises computer systems for performing the inventive methods.

Furthermore, the invention comprises computer-readable storage media comprising program code for performing the inventive methods, when loaded into a computer system.

One of the advantages is that the present invention provides various possibilities to process the plurality of alerts, and the possibility to determine the intended recipients for the notifications, and to set exactly the respective recipient, the medium, and the content of the notification messages that should be sent.

Hereto, alert notification profiles are maintained. In these profiles, the kind of notification, the recipient, the medium, the message format, which kind of alert, and in which time limit (due terms), a notification should be done. The recipient can be a system user, a partner, or a direct e-mail address, fax number or pager number.

The medium, via which notifications should be transmitted, may be set either explicitly or by timing rules, which may vary depending on the particular user. For example, during working hours, the notification may be transmitted via e-mail, and during week-ends and nights via a pager.

In a further embodiment, the alerts may be processed depending on the channel of transmission. The processing may include aggregation of messages according to predefinable parameters or according to statistic criteria over all the applications. The messages may be directly comprised within an e-mail, or as attachment in the form of a table sheet or a word file.

The inventive methods may comprise one or more mechanisms to collect the alerts from the applications. In the pull-mechanism, alerts may be automatically retrieved from the applications, and corresponding notifications may be transmitted according to the respective notification profiles. In the push-mechanism, the connected application may transmit alerts to the system according to the invention. The system may process these alerts, and may transmit notifications based on the alerts according to the respective notification profiles. In the event-mechanism, one of the connected applications may send a trigger to the system according to the invention if a particular event happens. Then, the system according to the invention may transmit notifications according to the relevant notification profiles.

In a further embodiment, the present invention may manage escalation processes. Based on an alert, the system may transmit an alert notification according to the notification profile. If an alert is not addressed to by the intended user after a predetermined time, the notification may be transmitted to a second user, e.g., to the group leader.

The alert notification may be a generic engine which is developed as an encapsulated package that is part of my SAP SCM 4.0 (a software product delivered by SAP). Alert notification may be linked e.g., to APO alert monitor. The interfaces can also be used in conjunction with other applications. The selection of alerts may be done by the respective application. The alert notification engine may not store alerts. Besides configuration, it may contain only run-time transactional data. Alert notification may determine recipients of alerts according to notification profiles. The determination of recipients may be done within the alert notification engine according to the notification profiles that users or an administrator have set up. Users might be grouped according to business partners and an administrator might be allowed to maintain data for one or several specific business partners only.

Alert messages (texts and attachments) may be compiled within the alert notification engine according to the message mode. Specialized implementations for specific customers can be added by using the BADI technique (Business Add-In, a technology delivered by SAP). The information needed may come from the application (e.g., APO alert monitor) and the notification profile. The message content may be partly related to the message channel. Detailed user time setting for message channels can be maintained within the alert notification engine according to the invention.

The message channel may be determined in the alert notification engine and passed along with recipient and message content into the SAP technology that provides the technical functions of sending out alerts.

Alert notification may be integrated with an alert monitor. The alert notification interfaces may be built in a generic way, so that other applications can make use of the functions of alert notification in a similar way as the APO alert monitor.

DESCRIPTION OF THE EMBODIMENTS

Figure 1:
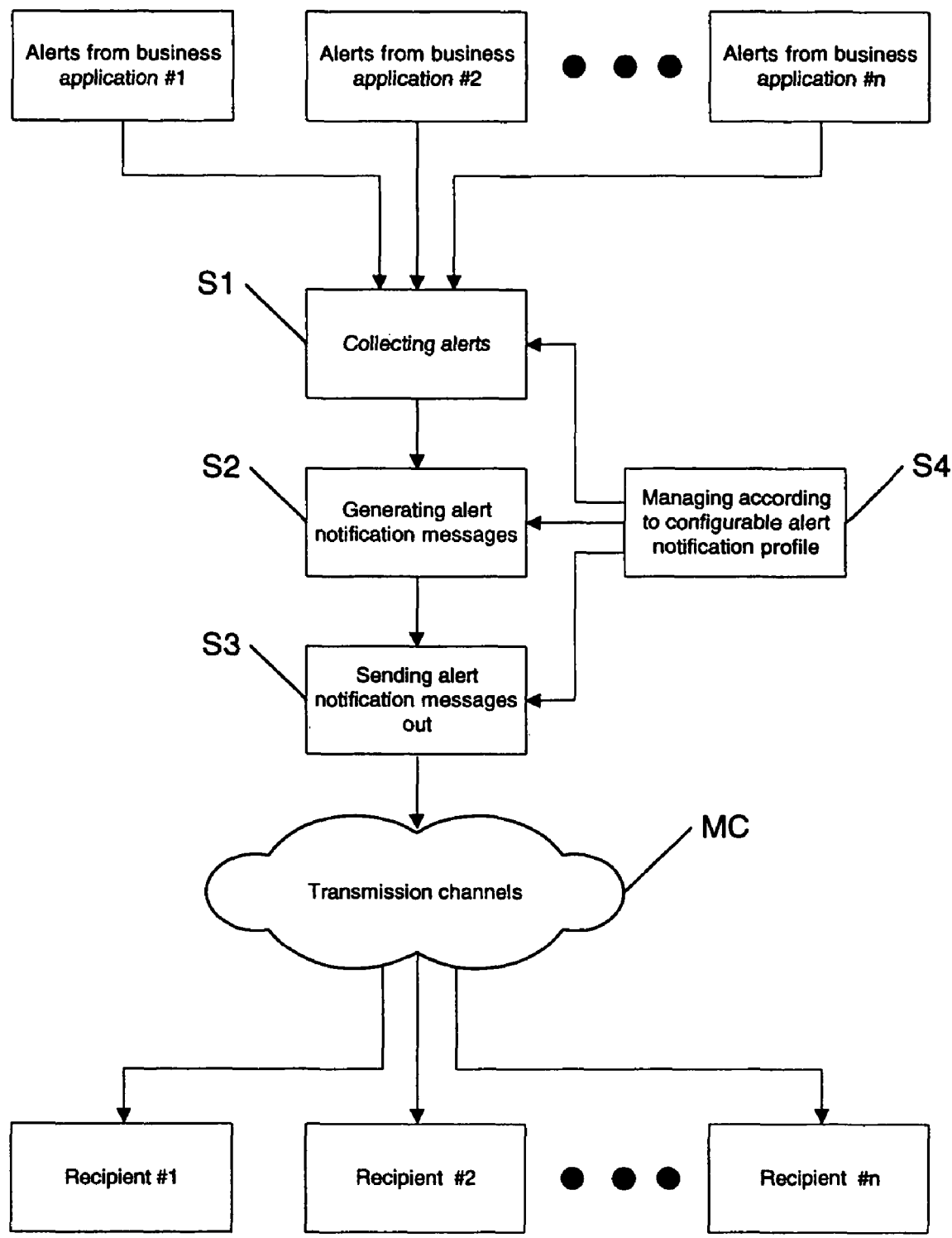
FIG. 1 illustrates a first embodiment of the present invention.

FIG. 1 shows the inventive method according to a first embodiment of the invention. Alert messages from several business applications #1, #2, . . . #n are collected in step S1, and alert modification messages are generated in step S2, and, in step S3, sent out to recipients #1, #2, . . . #n, through respective transmission channels MC, whereby alert collecting, alert notification message generating and sending out are managed according to a configurable alert notification profile.

Figure 2:
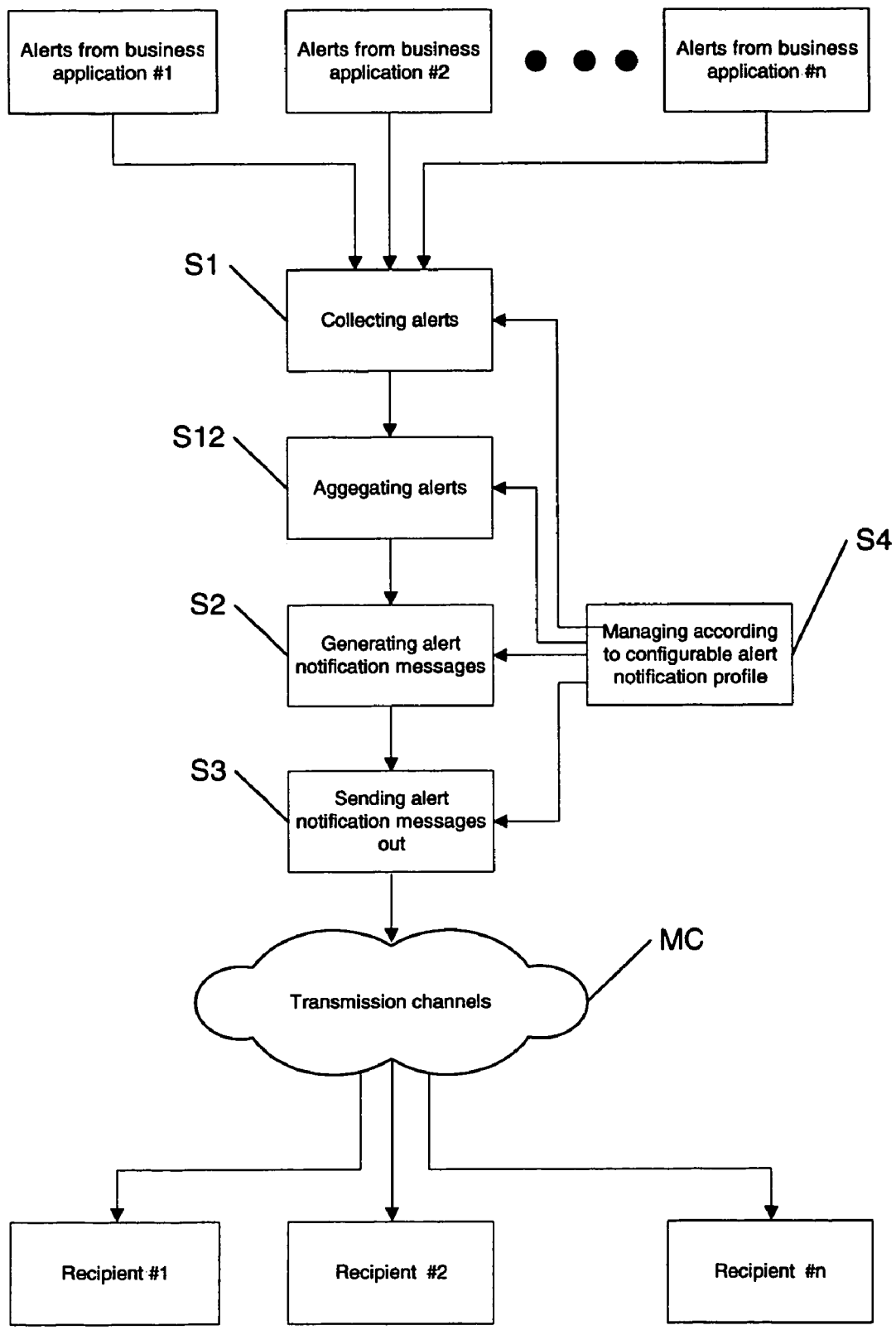
FIG. 2 illustrates a further embodiment of the present invention.

As shown in FIG. 2, alerts can be aggregated upon collecting, see step S12.

A further embodiment shows the application of the alert notification system of the present invention in a supply chain management (SCM) application, implemented in the Advanced Planner and Optimiser (APO) software package from SAP. However, SCM alert notification may be a generic engine that encapsulates functions that are not specific to APO and can be used in other contexts. It may be developed as a package that is part of SCM basis. Alert notification can be linked to APO alert monitor in a defined manner with few interfaces that can also be used in conjunction with other applications.

The alert monitor may be a central monitoring functionality that handles exceptions from external applications. Alerts can be posted to the alert monitor (database alerts) or retrieved by the alert monitor on request (dynamic alerts). Alert type, priority and a list of parameters, which depend on the alert type, may categorize alerts. Alerts may be selected according to alert profiles. They may be viewed and acknowledged in the alert monitor, which also provides links to APO transactions to deal with the corresponding data. The alert monitor can function stand-alone or embedded into planning transactions.

Alert management may be a technology framework to inform parties of alert situations. Information can be provided through e-mail, SMS, Fax, WAP portal, SAP Portal. Users can subscribe to alert categories and specify the message channel, which they want to use.

SCM alert notification may be an engine in SCM Basis that encapsulates functions to select or filter alerts relevant for messaging to specific recipients, to create the appropriate messages and to actively send them through various message channels. This may be done according to rules depending on content of alert, recipient and time.

Figure 3:
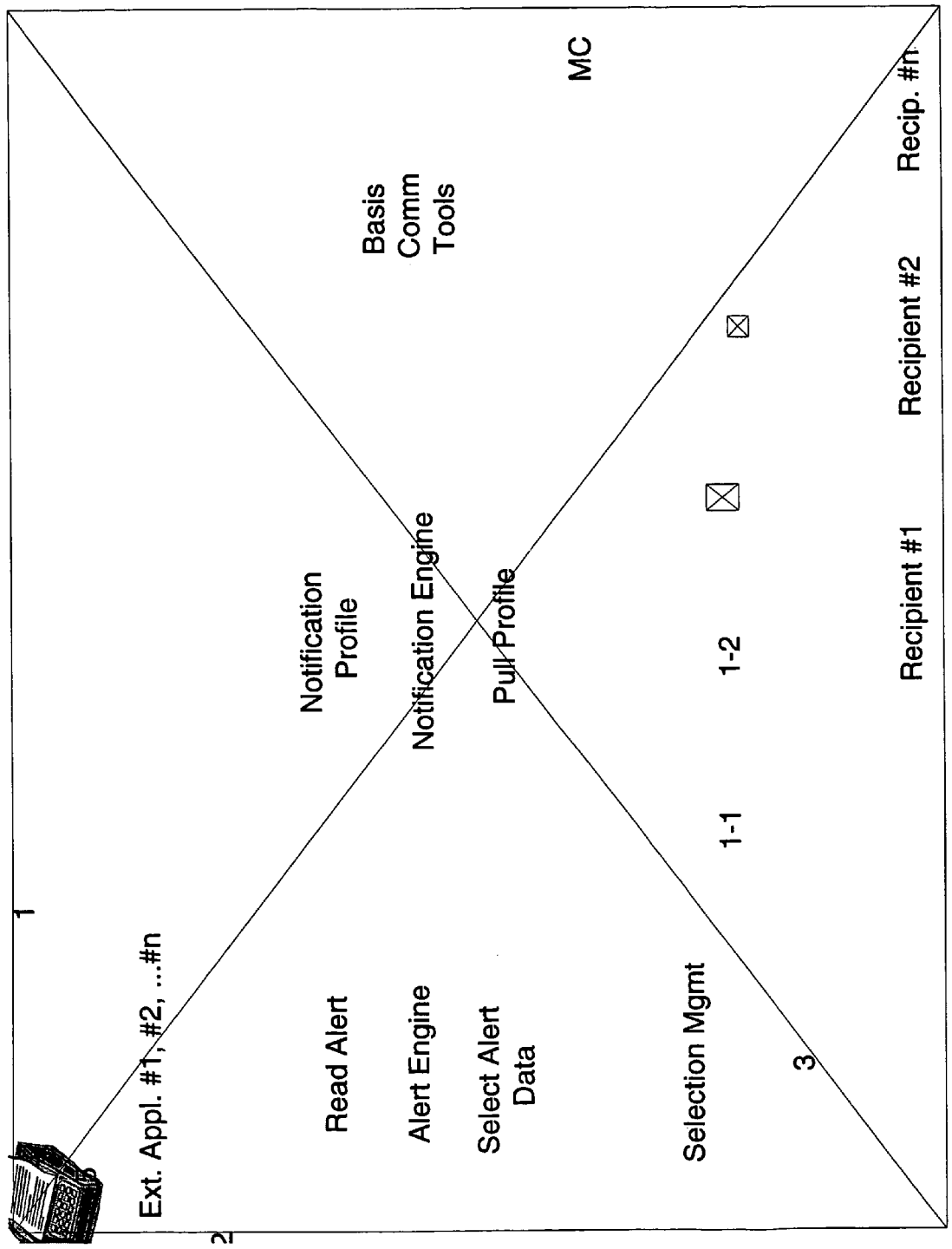
FIG. 3 illustrates an exemplary system for implementing the method according to FIGS. 1 and 2.

FIG. 3 shows an exemplary system for implementing various embodiments of the methods of FIG. 1 and 2. One or several alerts originating from several business applications 5; #1, #2, . . . #n, may be collected in the notification engine 1, and one or several alert notification messages may be generated and sent out to the respective recipients #1, #2, . . . #n, through a message transmission channel MC. Collecting the alerts, generating alert notification messages and sending them out may be managed in the alert notification engine 1 according to respective alert notification profiles 1-1. The alert notification profiles 1-1 may be configurable. Each alert notification profile may comprise information relating to the group of recipients of the alert notification messages, the time schedule and the channel of transmission of the alert notification messages. In one embodiment of the invention, the alert notification profiles 1-1 may be administrated in the alert notification engine 1.

The alert notification engine 1 according to this embodiment may preferably not store alerts. The alerts may be stored in alert engine 2. Selection management 3 may be for selecting the alert data. The alert engine 2 may be connected to the alert notification engine 1. Further connected to the alert notification engine 1 may be communication tools 2 which provide communication via messaging channels MC, e.g., e-mail, SMS, Fax, WAP portal, SAP Portal, for notification of alerts to the respective recipients #1, #2, . . . #n.

Besides configuration, the alert notification engine 1 may contain only run-time transactional data. SCM alert notification engine 1 may make use of SAP Technology features (alert management) for the sending alert messages. The alert notification engine 1 may determine recipients of alerts according to notification profiles 1-1. These profiles can make use of functional calls into the alert monitor (or other application) for selection. The alert messages themselves (text and attachments) may be compiled within the alert notification engine 1 according to the message mode that is configured there. This message content then may be transferred into the alert management for sending it to recipients. Detailed user time settings for message channels can be maintained within the alert notification engine 1. The message content may be partly related to the message channel MC. The message channel MC may be determined in the alert notification engine 1 and passed along with recipient and message content into alert management.

The primary target group may be made up of all internal or external users working with the APO alert monitor and external partners and their representatives that need to be notified of exceptions. In a more general context of notification linked to other applications than the alert monitor, additional users may be targeted.

Figure 4:
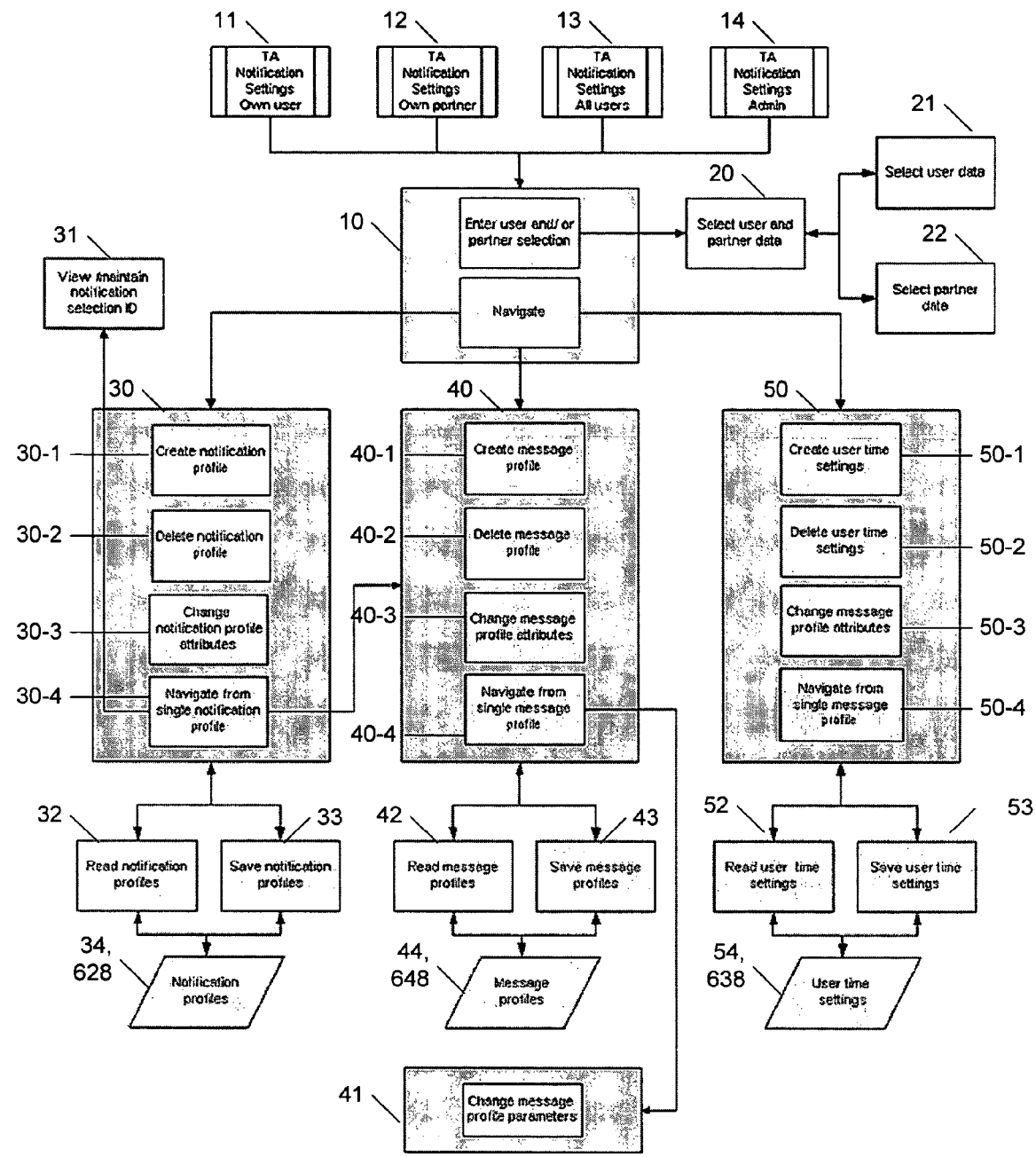
FIG. 4 illustrates an exemplary configuration-time program flow.

FIG. 4 shows an exemplary configuration-time program flow. Transaction notification settings may be available for own users 11, for own partners (partner administrator) 12, for all the users 13, and for an overall administrator 14. The user and/or partner selection can be entered at 10. From there, the program flow branches off to a menu 20 for selecting user data 21, and partner data 22. Navigation from the main menu 10 may branch off to the notification menu 30, the message profile 40, and the user time settings 50, respectively. Each of these menus may offer four steps, namely create, delete, change, and navigate from the profiles 30-1, . . . , 30-4; 40-1, . . . , 40-4, and 50-1, . . . , 50-4. The respective profiles 34, 44, and 54 can be read and saved, 32, 33; 42, 43; 52, 53.

Figure 5:
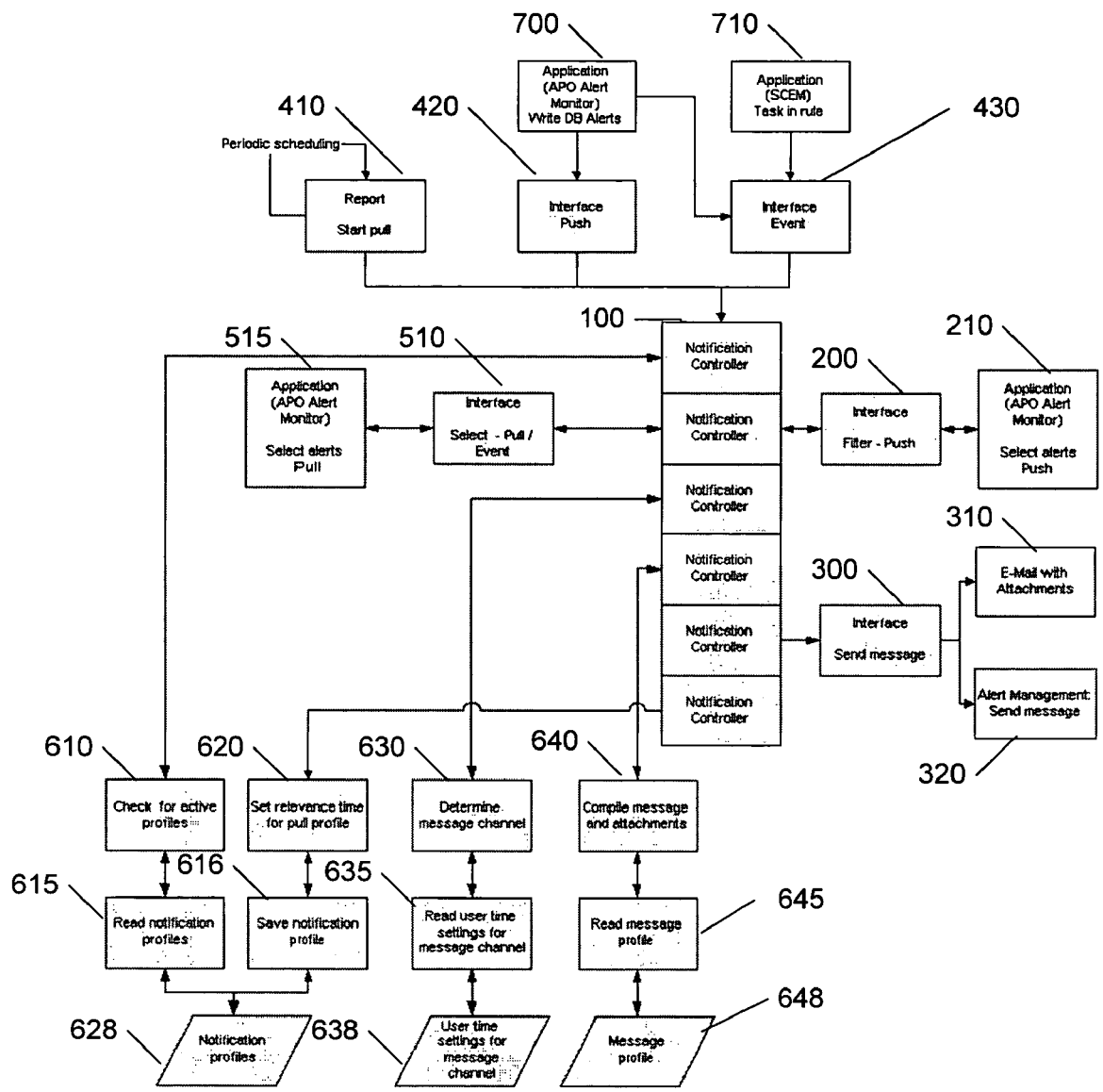
FIG. 5 illustrates an exemplary run-time program flow.

An exemplary run-time program flow is explained with reference to FIG. 5. The functions of alert notification engine 1 may be controlled by notification controller 100. Alert notification engine 1 may collect alert via several interfaces 420, 430. The alerts, stored in an alert database by an external application can be pushed via the push interface 420 into the alert notification engine 1. Other alerts may be transmitted to the alert notification engine 1 event-driven via event interface 430 according to an application task in a rule 435. Alerts may also be received from an external application via a pull mechanism 410. This pull mechanism 410 may be started periodically from the alert notification engine. Push and pull mechanisms are described later in more detail.

With respect to notification profiles 1-1, 628, the notification controller 100 may control checking for active profiles step 610, reading notification profiles, step 615 and further the setting of relevance time for pull profiles, step 620, and saving notification profiles, step 616.

The notification controller 100 may further control user time settings for the message channel, step, 638 allows to read the user time settings, step 635, and to determine the message channel, step 630.

In step 645, message profiles 648 may be read under control of the notification controller 100. In step 640, messages and attachments may be compiled.

The notification controller may further control a filter-push interface 200 which couples to an application (APO alert monitor) for selecting alerts push 210, and a send message interface 300 for sending e-mails with attachments 310 and alert management send message 320.

User interfaces Ul may be provided to configure the notification of users and partners. These user interfaces may be accessible to individual users to maintain their own data and to administrators to maintain their own, general partner's and other user's data. The administration rights may be limited to the own partner's data. The following transactions may be implemented: (1) define own user notification profiles and time settings for message channels; and (2) define all partners' notification profiles and time settings for message channels.

They may be integrated with the definition of alert profiles 1-1.

Alert notification may be integrated with the alert monitor. The following exemplary functions are provided: (1) interface 510 alert notification to alert monitor to select alerts 515 for pull/event based notification mechanism; (2) interface 420 alert monitor 700 to alert notification for push messaging; (3) interface 200 alert notification to alert monitor to filter alerts for push based notification mechanism; (4) usage of alert profiles to describe relevance conditions in notification profile; and (5) integration of Ul transactions for notification profile and alert profile.

These interfaces may be designed to be independent of the alert monitor. The alert notification interfaces may be built in a generic way, so that other applications, which need to send alerts or general messages, can make use of the functions of alert notification in a similar way as the APO alert monitor. This may be achieved by introducing customizing that allows configuring the implementation of the alert notification interface. The key for such customizing is an "application". One may need to define these applications together with the class implementing the alert notification engine interface.

The interface for alert notification integration may describe (call-back) functionality that the application needs to provide to work with alert notification.

To link an external application 5 to alert notification, the following may be done: (1) implement an interface defined by alert notification; and (2) call alert notification for push or event based notification (optional). Pull based notification works without trigger.

The alert notification functions may use SAP Technology functions for appointment rules (recurring time intervals) and display of time intervals to maintain the user time settings for message channel MC. With the alert management of SAP technology the user can set the message channel MC either globally or time dependent. The flexibility of the implementation provided by the alert management is limited, so that it remains necessary to implement special appointment rules for the alert notification engine. The message format and contents can depend on message channel. Therefore it may be necessary to determine the message channel before creating the messages. Overall this may lead to an architecture where message channel settings are implemented within the alert notification engine, so that at run-time the message channel is determined there and transferred to the alert management.

For notification of partners, interfaces to SCM partner master data may be needed to determine a partner's communication address data (e-mail, phone for SMS, fax). Furthermore, an interface may be needed to determine the partner that a user belongs to.

Communication may be governed by notification profiles 1-1, 628 that are used to determine recipients of alerts and the way they are to be notified.

Each notification profile 1-1; 628 may describe a communication rule in the sense that it may bundle a selection of alerts with corresponding recipients and the way alert messages are to be distributed.

The notification profile 628 may be similar to the former alert monitor messaging table /SAPAPO/AMSG_PRF, which may be extended to describe combinations of the following objects: (1) notification selection ID; in case of alert monitor this corresponds to the ID for alert monitor overall settings, which includes the alert monitor profile; (1)partner (optional); (3) user (optional); (4) communication address data (optional); and (5) application ID.

Either partner, user or direct communication addresses may need to be specified as a recipient. There can be more than one selection ID for notification of each recipient. Each selection ID can be used to notify several recipients. The notification selection ID may be an identifier to describe a selection of alerts (or general messages) that is used by the application to select relevant message content. As an example, for the alert monitor it may correspond to the alert setting ID and may describe a selection of alert types and objects relevant for notification and can also be used to define the priority of alerts.

Configuration of the recipients of notification may be done either for SAP users or partners or by stating recipient addresses (e-mail, fax, SMS) explicitly in the communication settings, so that external partners or their users do not need to be modeled within the alert notification's system. If partners or users are specified, communication settings may be taken from the corresponding master data. Explicit communication addresses in the notification profile may shade the master data. A notification profile may be valid for one application only.

Other parameters may define the details of the notification process, including, for example, (1) attributes to detail the notification mechanism; (2) message mode: individual, collective, aggregated; and (3) preferred message channel.

Alert settings can be evaluated and corresponding messages are created by the pull or the push mechanism, which are described later.

Exemplary message modes and message channels are described below in more detail.

Further parameters of the notification profiles 1-1, 628 may describe limitations of the scope of the communication rule, including for example: (1) validity with respect to notification mechanism: push/periodic/event; (2) priority threshold for relevant messages; (3) active/inactive indicator; (4) unconfirmed only flag; (5) minimum age for unconfirmed alerts; (6) and maximum age for unconfirmed alerts.

The priority threshold may filter the alerts to be sent.

The active/inactive indicator can be used to switch the validity of a notification profile on or off.

Alert notification can be restricted to sending out unconfirmed alerts only. This can be used to model escalation processes. "Unconfirmed" in the example of the application being the APO alert monitor means the alerts have neither been acknowledged nor hidden by a user, but other implementation and interpretation of this indicator is possible with other applications. The selection of unconfirmed alerts can further be restricted to alerts that satisfy a minimum (and maximum) age.

By way of a non-limiting example, the message mode together with the notification message profile 648 and information on the message channel describes how a message is built from the alert information coming from the application using the alert notification engine.

Alert notification may be done in one of three message modes A, B, and C. The message mode to be used in a communication rule may be configured within the notification profile.

A message profile 648 may describe details on how to put together the messages. The compilation of messages may be enhanced by BADI to enable customers to change the appearance of messages.

Mode A: Separate messaging: in mode A, a separate message may be created for each alert relevant for notification. By way of a non-limiting example, the message may contain: (1) short message text; (2)long message text; (3) and alert parameters.

In the message profile 648, one can define which parameters are to be used.

Message texts and parameters may be usually provided by the application that uses alert notification 1, e.g., the alert monitor. The alert notification 1 itself may merely assemble messages from this data and may distribute them. However, a message can also be specified by defining a new message category in the alert management. This category with given texts may then be configured in the notification profile and used instead of the default category that uses dynamic texts.

Mode B: Collective messaging: in mode B, all alerts relevant for notification may be collected and put into a single message. Mode B can be combined with mode C in a single message. This message may contain a few general descriptive lines about content, origin and time of creation and an attachment that contains all the single messages either in form of a table that is compatible with Microsoft Excel or in the form of an XML file. The attachment can also be given as content of the main message. This can be used for e-mails and is necessary for message of type FAX.

Mode C: Aggregated messaging: in mode C, as in mode B, all alerts relevant for notification may be collected and put into a single message. Mode C can be combined with mode B in a single message. This message may contain an overview of alerts by giving the statistics of alert numbers: the alert messages are aggregated in the sense that their numbers are counted with regard to configurable categories. These categories can be freely defined from the alert parameters of the relevant alert types. The categories to be used may be specified by the message profile.

The alert numbers can be given in the form of either absolute numbers or relative numbers (percent) or both.

Message profiles 648 may be used to describe properties of the content of alert notification messages. Type of text to be used for individual messaging: short text, long text or alert parameters. By way of a non-limiting example, the properties are: (1) type of aggregated number to be used for aggregated alert information in collective messaging: absolute, relative (percent), or both; (2) type of attachment to be used for collective messaging; (3) alert parameters to be used for text in individual messaging; and (4) alert parameters to be used for aggregation.

The properties may be specified independently of the message. channel, but specific handling may apply depending on message channel.

The header table may contain general properties while the parameter table describes the relevant parameters for aggregation in collective messaging and text in individual messaging respectively. Parameters are fields of the alert structures that hold the contents of the alerts.

By way of a non-limiting example, message channels MC are the different means to transmit information to the user. The available message channels are described below. Most MC may utilize the SAP technology alert management framework, so that the corresponding SAP Technology features become available. In particular, it is possible to use a central messaging server MS that collects the messages from several systems and to link to external messaging tools offered by third party providers. Alert management may offer XML based interfaces to external messaging software. User and time dependent message channel settings may determine the MC to be used for the combination of user or partner and time of messaging.

If no such settings are given or if they are non-unique they can also be taken directly from the alert notification profile (similar to the communication addresses). This is valuable for scenarios where external partners or users are not modeled but communication to specific addresses by a specific channel is necessary.

The message channels that are available to users may be customized for configuration of their notification profile and user time settings according to the policies and technical details of a specific customer implementation. The following gives a list of exemplary messaging channels MC supported by the alert notification engine 1:

E-mail messages can be sent from the SCM system directly for message modes A, B, and C. For this message channel, attachments can be used. For individual messages short text, long text and all relevant parameters are transmitted as determined by the notification message profile 1-1. By way of a non-limiting example, the message contains at least the following parts: (1) header information (always): introductory text from message profile; creation time; creation user; system of alert origin; and reason code (for push and event based scenarios, see below): (2) alert texts according to message profile (message mode A); (3) alert parameters as name value pairs as given by message profile (message mode A); (4) alert statistics according to alert parameters in message profile (message mode B); (5) list of all alerts with detailed information in table format as attachment (message mode C); and a (6) hyperlink to enable navigation to the alert application, e.g., APO alert monitor's web screen.

E-Mail via SAP Technology alert management: E-mails without attachments (message modes A and B) can be sent via the SAP alert management. This allows using the features of the alert management, e.g., usage of a central messaging server, alert inbox for portal integration, confirmation of messages in this alert inbox. The messages themselves may be compiled in the same way as for the direct e-mail channel.

SMS: SMS can be used for individual messages (mode A) and aggregated messages (mode C) only. The messages may be compiled in a shortened form (compared to e-mail) to comply with the SMS format.

The SMS channel may use SAP technology alert management.

Technically, pagers may be reached via the SMS channel and the pager/SMS interface (alert management). Therefore, in the alert notification engine the messages may be built in the same way as for SMS and the same limitations and features apply. The pager channel may use SAP Technology alert management.

Fax messages can be sent for message modes A, B, and C. For this channel, table attachments may be converted into regular text at the end of the message. Otherwise it is similar to the e-mail channel. The fax channel may use SAP Technology alert management.

All messages sent via SAP Technology alert management may be viewed in an alert inbox in a SAP Portal environment. In this way they can be viewed together with alerts posted by other applications, thus providing a single point of entry not only for SCM related but also other alerts. Alerts can be "confirmed" in the alert inbox of alert management. This constitutes an acknowledgment of receiving the message only. To confirm an alert message in the proper business context one may use the alert application itself (e.g., the APO alert monitor).

SAP Technology alert. management may offer access to the alert inbox via WAP technology.

The user time settings for message channel may describe the channel to be used to contact a user or partner depending on time. These settings may be defined by utilizing appointment rules in SAP Technology for the individual message channels. For each available message channel, one may define whether it is used in general or not used. Then appointment rules may define an exception from these general settings: either time intervals when the particular channel is to be used or excluded time intervals. One message channel may be set as global default. These settings may be possible for all users and for each user independently. The default channel may be used when no other channels are found to be valid. This ensures that there is always a channel for messaging.

A new maintenance transaction may group together all settings related to alert messaging from a single point of entry. By way of a non-limiting example, it consists of the following parts: (1) central screen to select user and/or partner and to navigate to the associated data; (2) maintenance of notification profile; maintenance of message profile; (3) maintenance of user time settings; (4) navigation to user data (SU01); (5) and navigation to partner data.

For authorization purposes, the maintenance transaction may come in four different flavors represented by differing transaction codes: maintain settings for all users and partners. By way of a non-limiting example, this includes the possibility to enter communication address data directly; maintain settings for all users; maintain settings for own users; and maintain settings for own users and partners.

Figure 6:
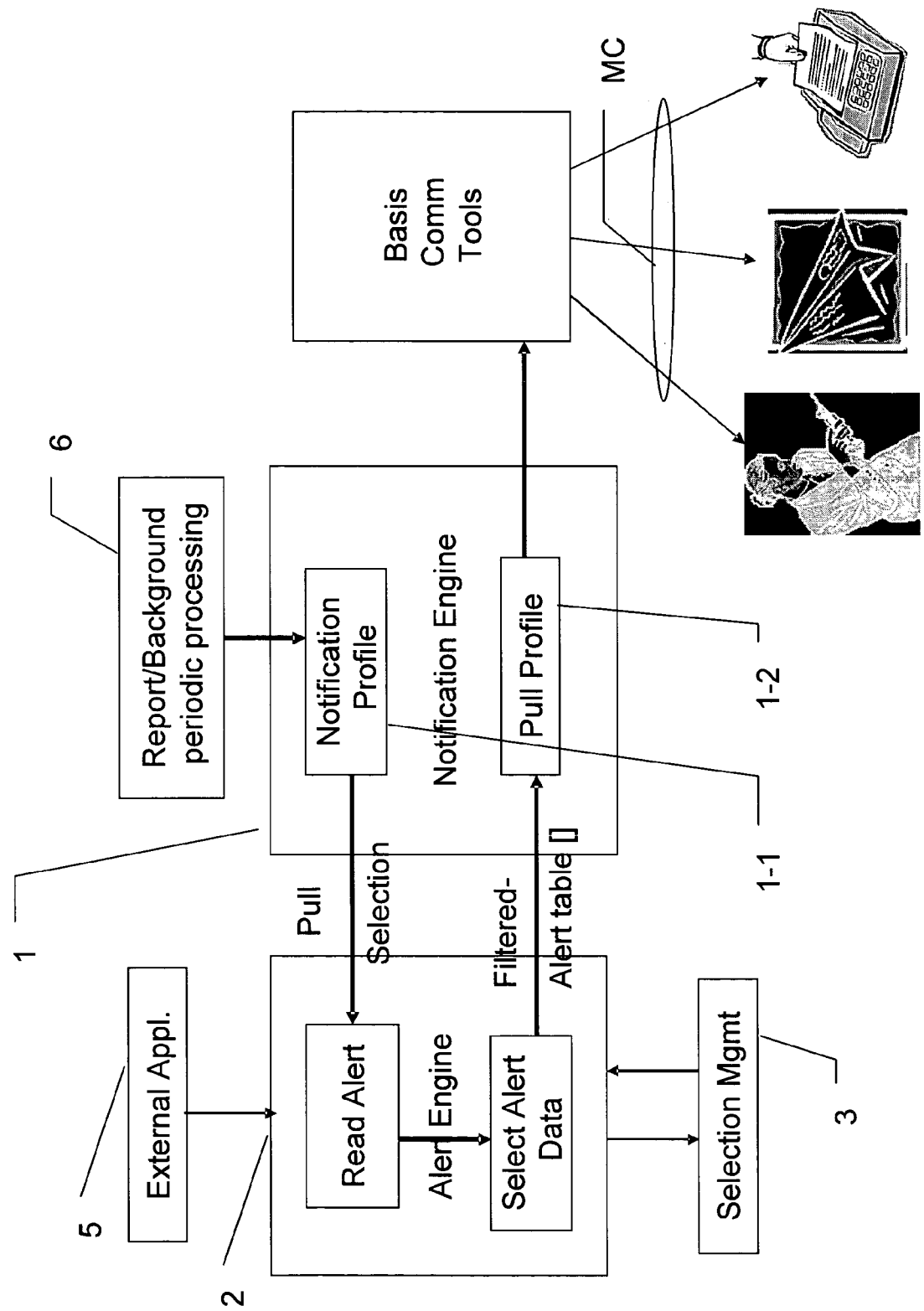
FIG. 6 illustrates an exemplary pull scenario.

The pull mechanism, refer to FIG. 6, may work with a report that is frequently scheduled and collects all the alert monitor settings of pull mechanisms that need to be evaluated for notification. In this context, one can define a recurrence time interval and a start time. These parameters may be used to compute when alert settings need to be re-evaluated to send out the corresponding alerts. The pull notification 410 may be started from within alert notification engine 1, 100. There may be no external application interface needed to trigger it. It may be performed by a report processing 6, 410 that periodically checks for notification profiles that are valid for pull notification and that need to be evaluated. The notification profiles may have a recurrence time (and offset). When the current time is greater than the last execution time plus the recurrence interval, a notification profile may become active: the report starts its evaluation. To evaluate a notification selection for the pull notification, the notification selection ID may be passed to a selection method of the corresponding application. This method may return alerts valid for notification. To enable escalation rules the method may need to be sensible to distinguish confirmed (resolved) from unconfirmed alerts, possibly with further time restrictions (as explained in the paragraph on the alert notification profile).

Figure 7:
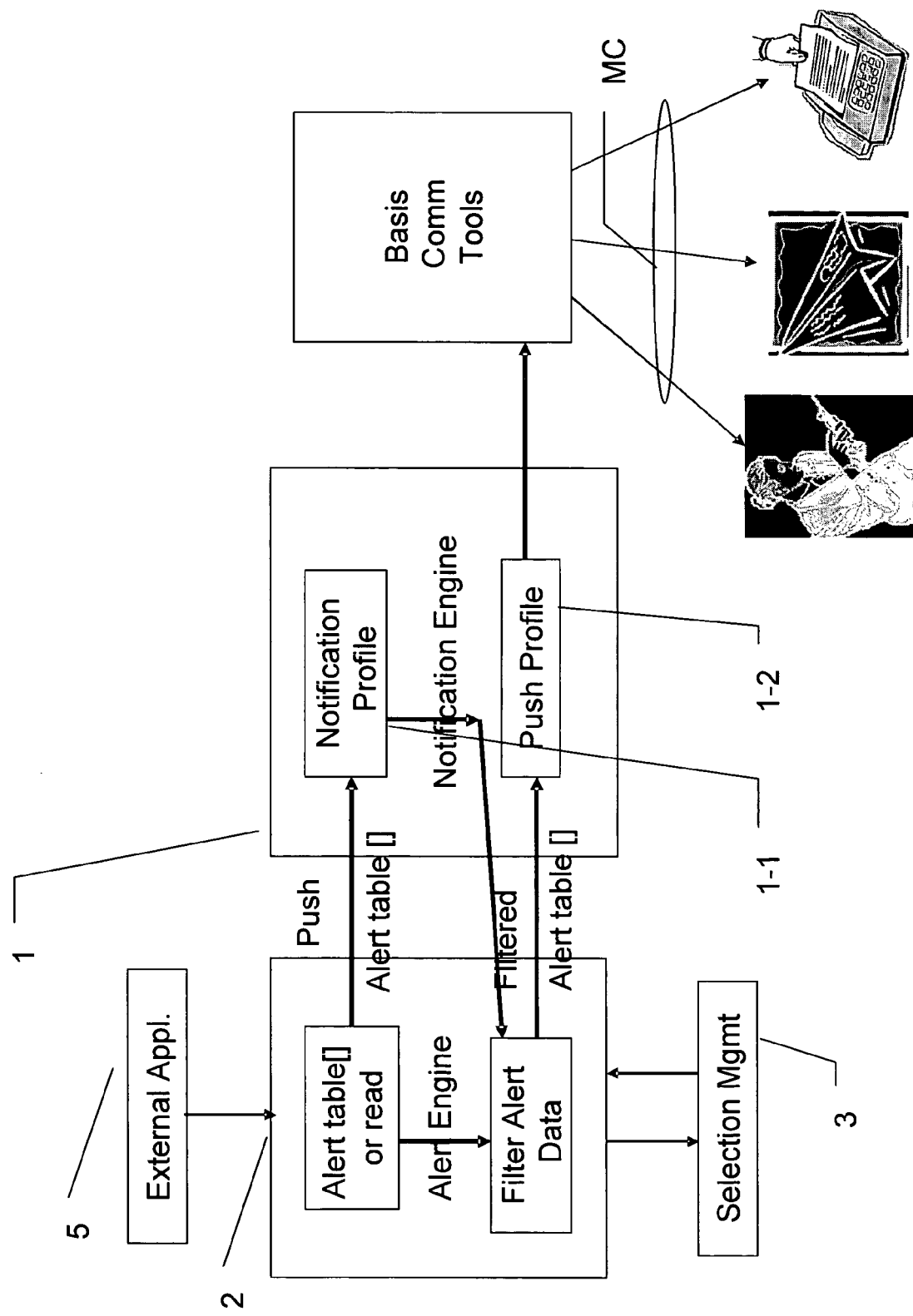
FIG. 7 illustrates an exemplary push scenario.
Figure 8:
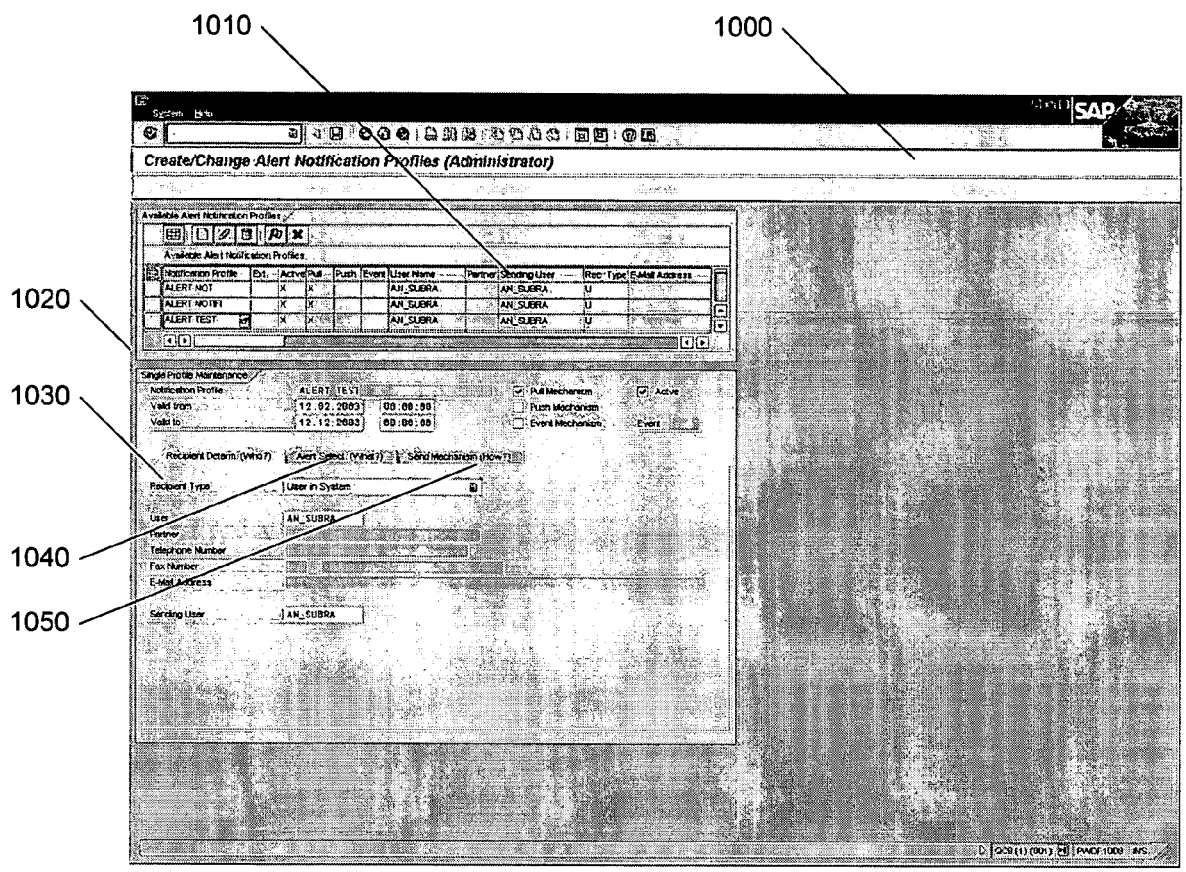
FIGS. 8-12 illustrate, by way of examples, screen prints of the alert notification engine.
Figure 9:
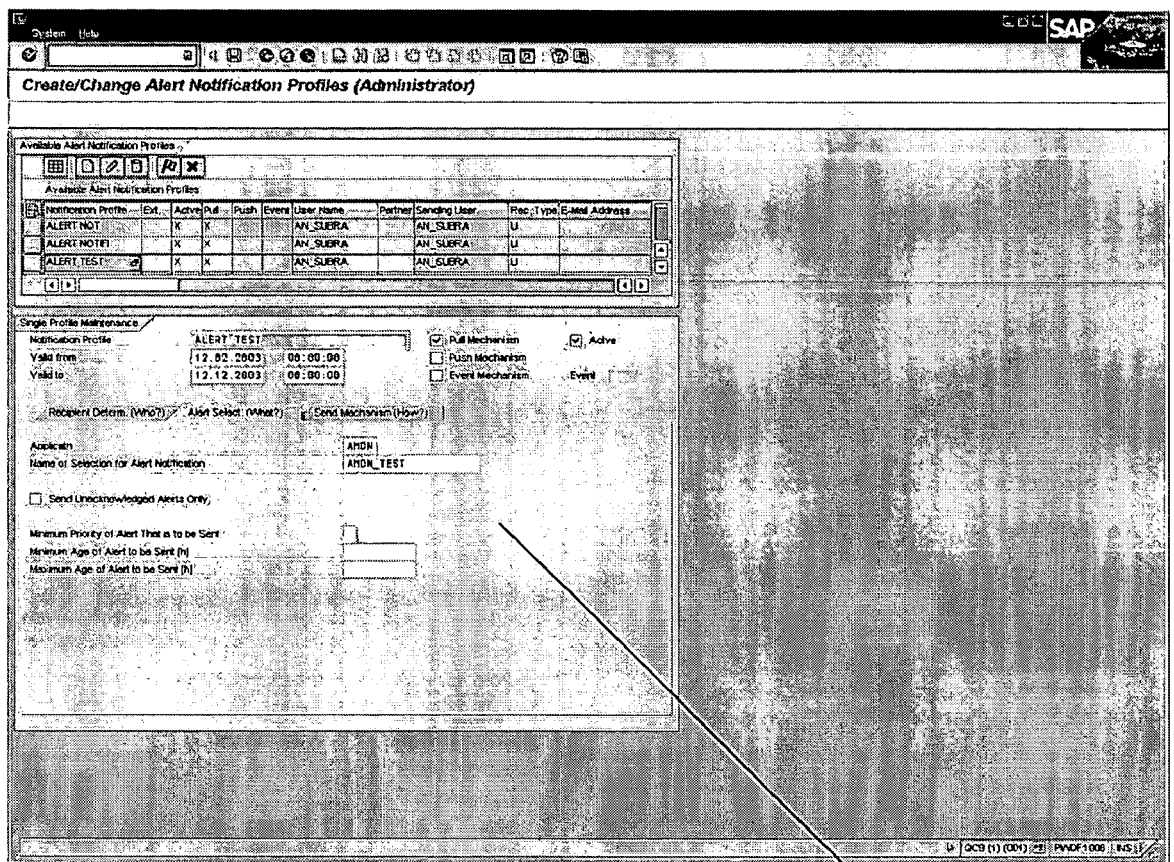
Figure 10:
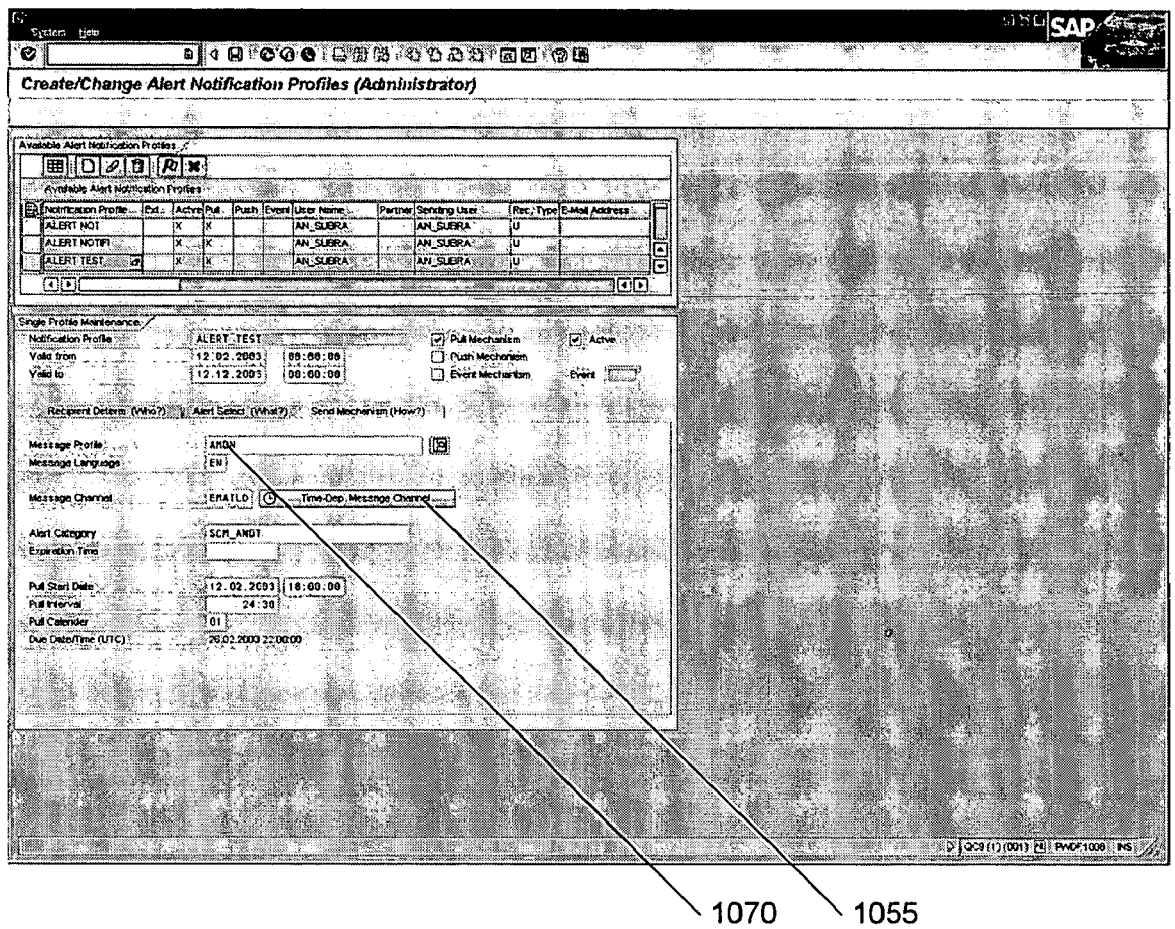

The push mechanism, refer to FIG. 7, may work for database alerts. In addition, there is the possibility to trigger the pull mechanism and hence notification through an event interface that can integrate with event management or other applications. The push notification 420 may be started from an external application 710. In the present embodiment, there may be integration with APO alert monitor database 700 alerts, but the concept is more general. Push notification may work by sending a list of alerts with their alert types, priorities and parameters to the alert notification engine 1, 100. The alert notification engine may look for active push profiles and calls back with the selection ID into the application to select the alerts out of this list that are relevant for distribution. A reason code can be given with the list of alerts and will be included into the alert messages.

Only database alerts may be available for the push mechanism. The occurrence of dynamic alerts may only be determined when actively searching for them, i.e., when pulling alert information.

Event based notification 430 may be triggered from an external application by calling an appropriate method of the alert notification engine. No alerts may be given with the call. Instead the alert notification engine 1, 100 checks for notification profiles that are event based and active. It then may start an evaluation of the corresponding selection IDs as in the pull case. As for push notification, a reason code can be given with the event and will be included into the alert messages.

Escalation processes may be modeled by defining notification profiles that extend to unconfirmed alerts only, possibly with further time restrictions. This was explained for the alert notification profile above. The selection methods of alerts provided by the applications may have to be able to distinguish unconfirmed alerts in order to allow escalation processes to unfold. For APO alert monitor 700 this will be handled by the "read alerts" methods.

By way of non-limiting examples, the following information may be stored in an application log: (1) notification profile 1-1, 628; (2) notification selection ID; (3) recipient: user (if applicable), partner (if applicable), e-mail address (if applicable), and phone number (if applicable); (4) message mode; (5) message profile; (6) messaging successful or error message; and/or (7) time of messaging.

This may serve to identify what information has been extracted for distribution. The full content of the messages may not be stored.

For a limited time messages may be stored in alert management for viewing in the alert inbox. This can be used to keep track of alert message content of those messages that are sent via the alert management for a short time span. Expiration time for storage can be defined in the notification profile.

By way of non-limiting examples, configuration may be provided in the following areas: (1) defining applications that use alert notification and their implementation of alert notification's interface; (2) defining message modes that should be available to users; and/or (3) defining central alert messaging server: this is done within the alert management framework.

Advantageously, no data volume problems may be expected, because the data volume for messaging is limited by the fact that it has to be useful for humans to use. Also, the collective and aggregated message modes may limit the number of messages that are created and have to be handled by alert notification engine and alert management.

FIGS. 8 to 12 show, by way of examples, screen prints of the alert notification engine while executing the maintenance functions for the alert notification profiles as described above. Exemplary screen 1000 of FIG. 8 comprises several fields. Field 1010 may display available notification profiles, which are named ALERT NOT, ALERT NOTIFI, AMON TEST, along with some of their current settings. The single notification profiles can be selected there from, and their settings can be displayed and changed by the register cards 1020, 1030, 1040, 1050.

In the single Profile Maintenance register card 1020, the notification, profile ALERT TEST may be selected. It may be valid from Feb. 12, 2003 to Dec. 12, 2003, and is an active profile applying the pull mechanism. The user name and the name of the sending user is AN_SUBRA. Register card 1030 may allow defining the recipient of alerts, register card 1040 allows setting the minimum priority and the minimum age of alerts to be sent, see FIG. 9 for further details. Register card 1050 (FIG. 8) may allow selecting the send mechanism, i.e., the message channel to be used for transmitting the alert message, see FIG. 10 for further details. As can be seen from FIG. 10, the message channel to be used may be time-dependent. The time-dependency may be set in the pull-down menu 1055. In the same register card 1050, the pull start date and the pull interval as well as the pull calendar may be set.

Figure 11:
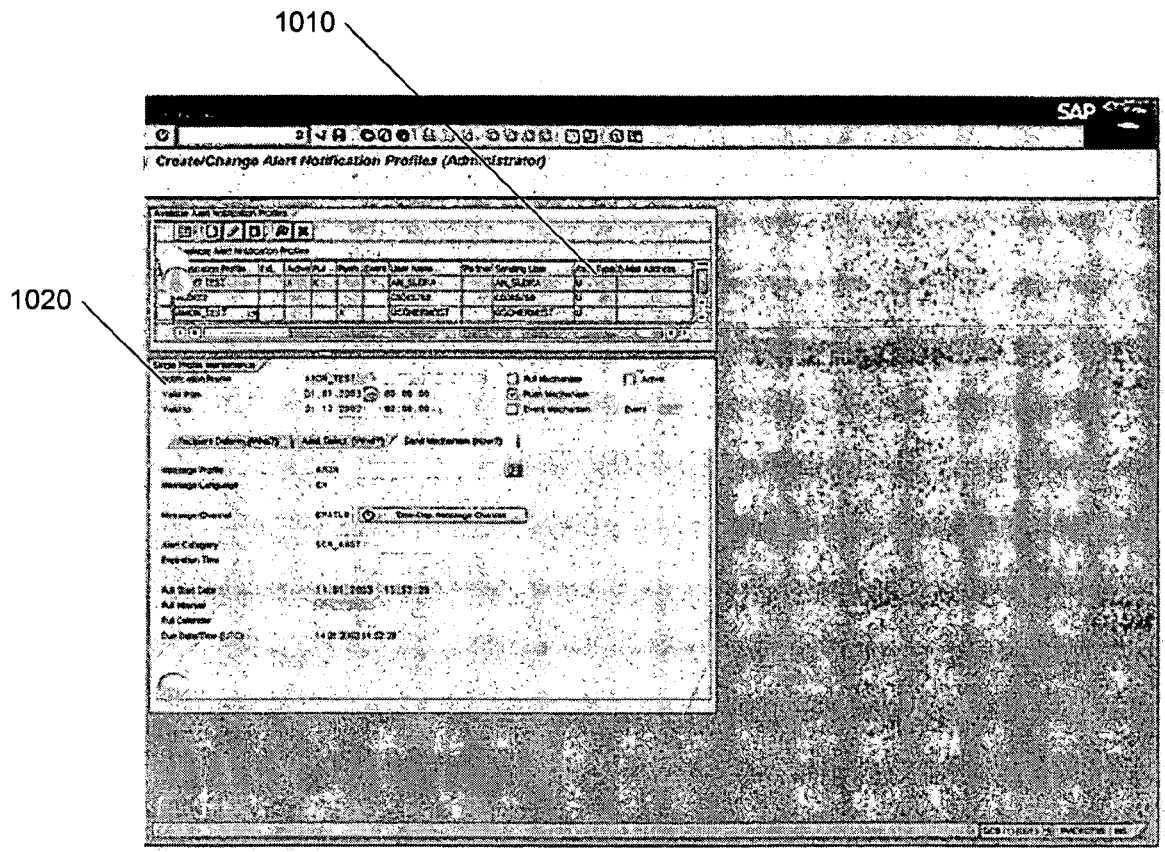

In the screen print of FIG. 11, examples of other alert notification profiles in field 1010 are provided. The third notification profile AMON_TEST, which is selected in this example for changing the settings, is applying the push mechanism, see Single Profile Maintenance register card 1020.

Figure 12:
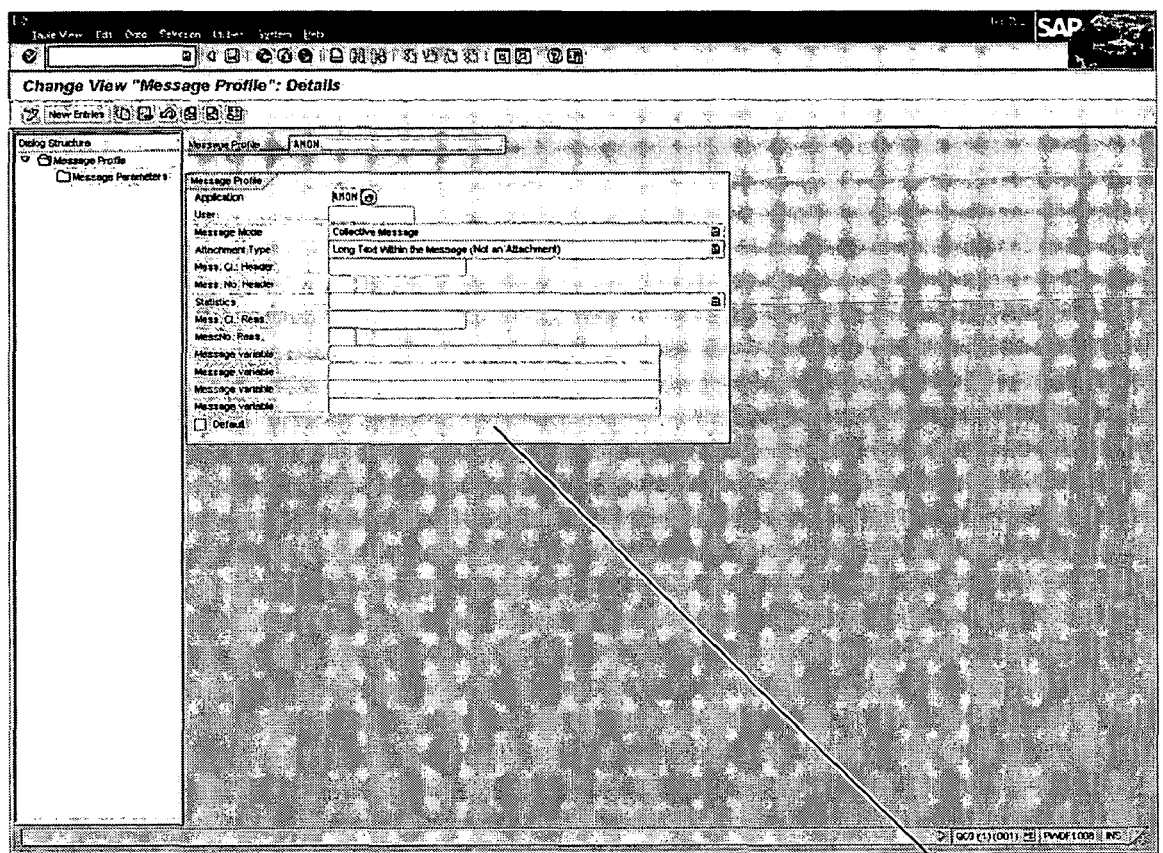

Exemplary register card 1070 for defining the message profile is shown in the screen print according to FIG. 12. As can be seen from register card 1070 in FIG. 12, depending on the message profile, the message mode, attachment type and further parameters for alert messages may be set.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/ or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus 21. The hard drive controller may be coupled to a hard disk drive suitable for storing executable computer programs, including programs embodying the present technique. The I/O controller may be coupled by means of an I/O bus to an I/O interface. The I/O interface may receive and transmit in analog or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An alert notification method, comprising:
receiving at least a first alert from at least one business application in predetermined time periods, based on a push mechanism defined in an alert notification profile;
receiving at least a second alert from the business application in the predetermined time periods, based on a pull mechanism defined in the alert notification profile;
receiving at least a third alert from the business application in the predetermined time periods, based on an event-based notification mechanism defined in the alert notification profile;
posting the first, second, and third alerts to an alert monitor;
categorizing the posted alerts by alert type, priority, and a list of parameters that depend on the alert type;
generating at least one alert notification message from the posted alerts;
sending out the at least one notification message to at least one first recipient through at least one transmission channel, whereby alert collecting, alert notification message generating and sending out is managed according to the alert notification profile,
wherein the alert notification profile is configured to comprise information relating to:
at least one escalation process;
at least one group of recipients;
at least one time schedule for transmission;
at least one channel of transmission; and
at least one method to create text out of the alert;
confirming whether the at least one alert notification message has been received by the at least one first recipient; and
notifying, as part of the at least one escalation process, at least one second recipient if the receipt of the at least one alert notification message is not confirmed by the at least one first recipient after a predefined period.

2. The method of claim 1, wherein the first alert is indicative of an exceptional situation in the at least one business application.

3. The method of claim 2, wherein the exceptional situation is defined as a relation of at least one variable of the business application to at least one predetermined value.

4. The method of claim 1, wherein a plurality of alerts are aggregated in a centralized engine.

5. The method of claim 1, wherein the first, second, and third alerts are at least one of filtered, aggregated, and bundled in statistic tables, according to configurable rules.

6. The method of claim 1, wherein the notification profile is administrated in the centralized engine.

7. The method of claim 1, wherein the alert notification profile is configured to further comprise information relating to a time schedule for retrieval of alerts from the business application.

8. The method of claim 1, wherein the alert notification profile is configured to further comprise a transmission format for the alert notification message.

9. The method of claim 1, wherein the time periods are administered in a centralized engine.

10. The method of claim 1, wherein the first alert is collected for notification which is sent by the business application.

11. The method of claim 1, wherein status information is included in the first alert.

12. The method of claim 1, wherein the alert notification message is re-sent depending on the status information of the first alert.

13. The method of claim 1, wherein the transmission channel comprises at least one of SMS, WAP, fax, pager, telephone, cellular phone, and electronic mail.

14. The method of claim 1, wherein the alert notification profile is administrated by a recipient.

15. A computer system comprising:

a processor; and a memory, the memory containing program instructions which, when executed by the processor, perform a method comprising:

receiving at least a first alert from at least one business application in predetermined time periods, based on a push mechanism defined in an alert notification profile;

receiving at least a second alert from the business application in the predetermined time periods, based on a pull mechanism defined in the alert notification profile;

receiving at least a third alert from the business application in the predetermined time periods, based on an event-based notification mechanism defined in the alert notification profile;

posting the first, second, and third alerts to an alert monitor;

categorizing the posted alerts by alert type, priority, and a list of parameters that depend on the alert type;

generating at least one alert notification message from the posted alerts, wherein the generation includes using the processor;

sending out the at least one notification message to at least one first recipient through at least one transmission channel, whereby alert collecting, alert notification message generating and sending out is managed according to the alert notification profile, wherein the alert notification profile is configured to comprise information relating to:

at least one escalation process;

at least one group of recipients;

at least one time schedule for transmission;

at least one channel of transmission; and at least one method to create text out of the alert;

confirming whether the at least one alert notification message has been received by the at least one first recipient; and notifying, as part of the at least one escalation process, at least one second recipient if the receipt of the at least one alert notification message is not confirmed by the at least one first recipient after a predefined period.

* * * * *